United States Patent
Yoshida

(10) Patent No.: US 11,044,023 B2
(45) Date of Patent: Jun. 22, 2021

(54) PARAMETRIC ARRAY SYSTEM

(71) Applicant: Mitsubishi Electric Engineering Company, Limited, Chiyoda-ku (JP)

(72) Inventor: Shunji Yoshida, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 505 days.

(21) Appl. No.: 16/084,498

(22) PCT Filed: Jan. 27, 2017

(86) PCT No.: PCT/JP2017/002969
§ 371 (c)(1),
(2) Date: Sep. 12, 2018

(87) PCT Pub. No.: WO2018/138876
PCT Pub. Date: Aug. 2, 2018

(65) Prior Publication Data
US 2019/0081711 A1    Mar. 14, 2019

(51) Int. Cl.
*H04B 11/00* (2006.01)
*H04R 3/12* (2006.01)
*H01Q 21/00* (2006.01)

(52) U.S. Cl.
CPC ......... *H04B 11/00* (2013.01); *H01Q 21/0006* (2013.01); *H04R 3/12* (2013.01); *H04R 2217/03* (2013.01)

(58) Field of Classification Search
CPC ...... H04B 11/00; H01Q 21/0006; H04R 3/12; H04R 2217/03
See application file for complete search history.

(56) References Cited

U.S. PATENT DOCUMENTS

| | | | | |
|---|---|---|---|---|
| 2019/0081711 A1* | 3/2019 | Yoshida | ................ | H04B 11/00 |
| 2019/0393966 A1* | 12/2019 | Yoshida | ................ | H04B 11/00 |

FOREIGN PATENT DOCUMENTS

| | | | | |
|---|---|---|---|---|
| JP | 6333480 B1 * | 5/2018 | ............... | H04R 3/12 |
| WO | WO-2018138876 A1 * | 8/2018 | ............. | H04B 11/00 |

OTHER PUBLICATIONS

International Search Report dated Apr. 4, 2017 in PCT/JP2017/002969 filed Jan. 27, 2017.

(Continued)

*Primary Examiner* — Daniel Pihulic
(74) *Attorney, Agent, or Firm* — Oblon, McClelland, Maier & Neustadt, L.L.P.

(57) ABSTRACT

A carrier wave generating unit for generating a carrier wave signal; a modulating unit for generating a modulated wave signal by performing amplitude modulation on the carrier wave signal generated by the carrier wave generating unit with an audio signal; an adding unit for adding the carrier wave signal generated by the carrier wave generating unit and the modulated wave signal generated by the modulating unit to generate a signal; an ultrasonic emitter for emitting the signal generated by the adding unit, and an ultrasonic emitter arranged on the central axis of the ultrasonic emitter and ahead of the emitting surface of the ultrasonic emitter, for emitting the carrier wave signal generated by the carrier wave generating unit in the same direction as the emitting direction of the ultrasonic emitter are included, wherein the phase of the carrier wave signal emitted by the ultrasonic emitter is opposite to that of the carrier wave signal included in the signal emitted by the ultrasonic emitter.

10 Claims, 4 Drawing Sheets

(56) References Cited

OTHER PUBLICATIONS

Kamakura, T., "Fundamentals of Nonlinear Acoustics," AICHI Shuppan, Jul. 20, 2010, 4 pages (with Partial Translation).
Tadashi, M. et al., "Audio Spot Design Based on Separating Emission of Carrier and Sideband Waves," The Transactions of Institute of Electronics, Information and Communication Engineers, A vol. J97-A No. 4, Apr. 2014, 10 pages (with Partial Translation).

* cited by examiner

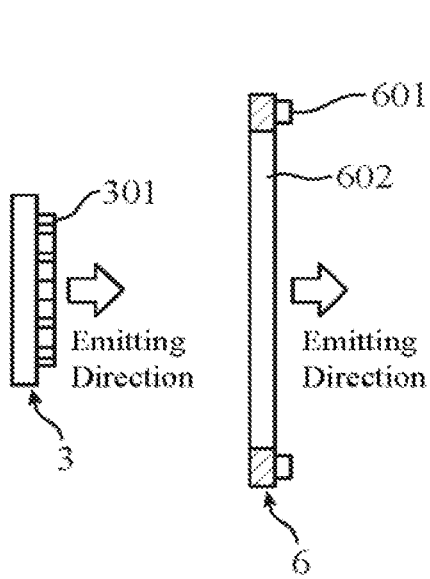
FIG. 2A
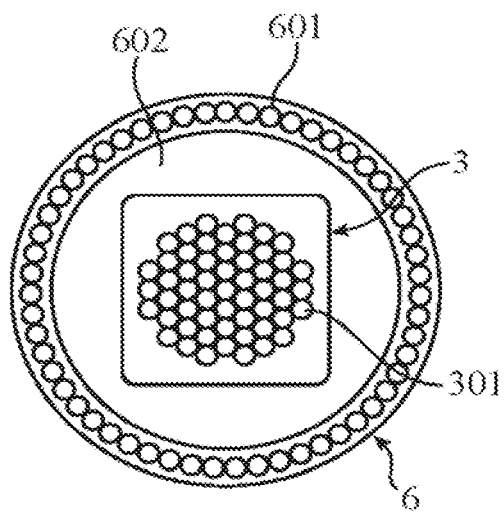
FIG. 2B
FIG. 3
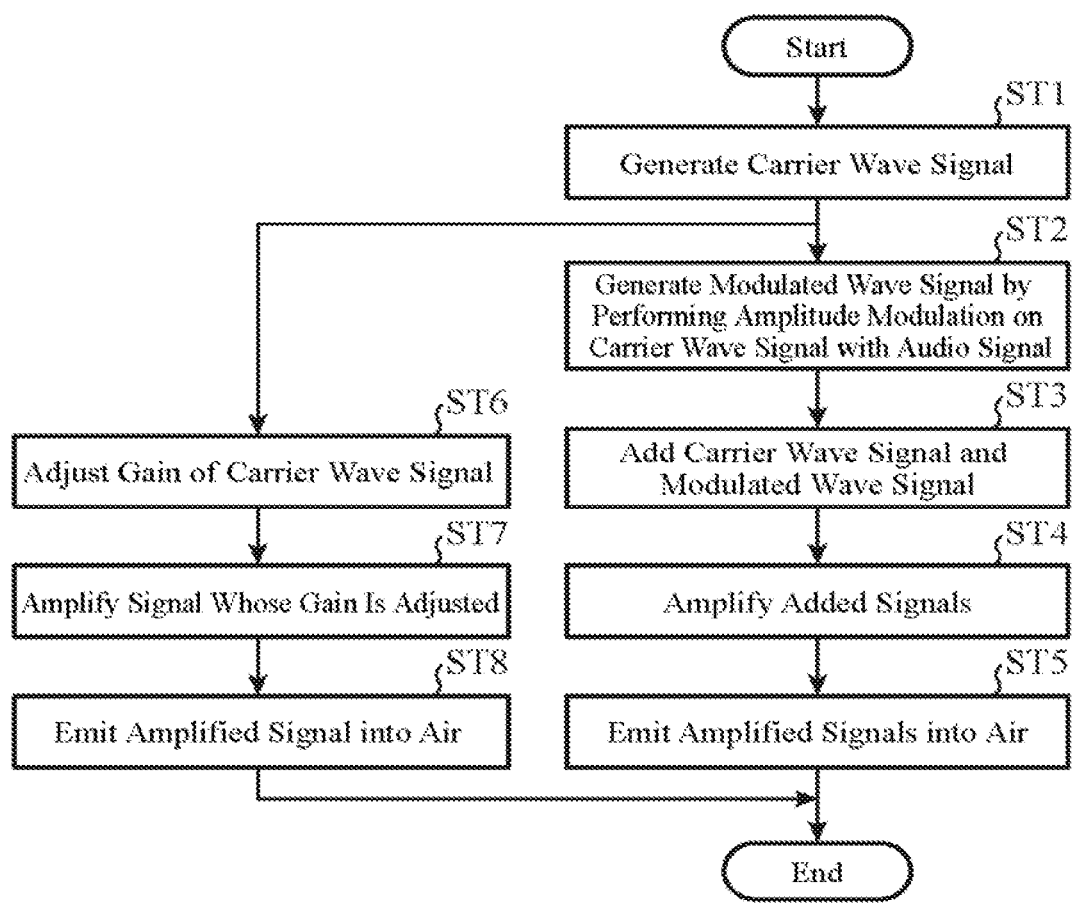

PARAMETRIC ARRAY SYSTEM

TECHNICAL FIELD

The present invention relates to a parametric array system that emits an audible sound to a narrow area by using a carrier wave signal in an ultrasonic band.

BACKGROUND ART

A parametric array system adds a modulated wave signal which is generated by performing amplitude modulation on a carrier wave signal in an ultrasonic band with an audio signal being an audible sound, and the carrier wave signal, and emits the added signals from an ultrasonic emitter. As a result, in the air, a difference tone between the carrier wave signal and the modulated wave signal occurs due to a nonlinear interaction between the carrier wave signal and the modulated wave signal, and the audible sound is self-demodulated.

This parametric array system has propagation characteristics having, for example, sound pressure levels as shown in FIG. 7. In FIG. 7, the horizontal axis shows the distance from the ultrasonic emitter, and the vertical axis shows the sound pressure level. Further, a thin line shows the modulated wave signal included in the signals emitted by the ultrasonic emitter, a broken line shows the carrier wave signal included in the signals emitted by the ultrasonic emitter, and a thick line shows the self-demodulated audible sound (difference tone between the carrier wave signal and the modulated wave signal).

As shown in FIG. 7, in an area close to the ultrasonic emitter, the nonlinear interaction between the carrier wave signal and the modulated wave signal is strong, in addition to a cumulative effect caused by the propagation of the signals, and thus the sound pressure level of the self-demodulated audible sound rises. At a propagation distance which is approximately a half of the Rayleigh length determined by the frequency and the vibration radius of the signal emitted by the ultrasonic emitter, the sound pressure level of the audible sound has a maximum. After that, at a longer propagation distance, the carrier wave signal and the modulated wave signal attenuate due to sound wave absorption and spherical diffusion, and the nonlinearity becomes weak. As a result, the sound pressure level of the self-demodulated audible sound reduces.

At this time, when the process of generating a difference tone is viewed spatially, because virtual sound sources of the difference tone are distributed in a propagating direction with a narrow beam width of the carrier wave signal and the modulated wave signal in an ultrasonic band, a narrow beam-shaped sound field (audible area) can be acquired (for example, refer to nonpatent literature 1).

As mentioned above, the conventional parametric array system can provide the narrow beam-shaped sound field. However, because the beam reaches a long distance, the sound can be heard at a place distant from the parametric array system. Further, a sound reflected by a wall, a ceiling or the like occurs indoors. Therefore, it is difficult for the conventional parametric array system to transmit a sound only to a certain specific area.

To cope with this, a method of emitting a carrier wave signal and a modulated wave signal separately from two respective ultrasonic emitters having different emitting directions from each other, and causing an audible sound to be self-demodulated only in an area in which the emitted carrier wave signal and modulated wave signal overlap with each other is proposed (for example, refer to nonpatent literature 2).

CITATION LIST

Non Patent Literature

Non Patent Literature 1: Tomoo Kamakura, Fundamentals of Nonlinear Acoustics, issued in July, 2010
Non Patent Literature 2: Tadashi Matsui et al., Audio Spot Design Based on Separating Emission of Carrier and Sideband Waves, The Transactions of The Institute of Electronics, Information and Communication Engineers A Vol. J97-A No. 4 pp. 304-312, issued in April, 2014

SUMMARY OF INVENTION

Technical Problem

However, according to the method disclosed in Nonpatent Literature 2, the area in which the carrier wave signal and the modulated wave signal overlap with each other is distant from the ultrasonic emitters, and the audible sound is self-demodulated in an area in which the nonlinear interaction is weak. Further, according to the method disclosed in Nonpatent Literature 2, an area in which the nonlinear interaction occurs is short. Therefore, a problem is that the sound pressure level of the self-demodulated audible sound becomes small.

The present invention is made in order to solve the above-mentioned problems, and it is therefore an object of the present invention to provide a parametric array system that emits both a carrier wave signal and a modulated wave signal in the same direction and that reduces the sound pressure level of an audible sound at a distant place at an a certain distance or more in the emitting direction.

Solution to Problem

A parametric array system according to the present invention, includes: a carrier wave generator to generate a carrier wave signal; a modulator to generate a modulated wave signal by performing amplitude modulation on the carrier wave signal generated by the carrier wave generator with an audio signal; an adder to add the carrier wave signal generated by the carrier wave generator and the modulated wave signal generated by the modulator to generate a signal; a first ultrasonic emitter to emit the signal generated by the adder; and a second ultrasonic emitter arranged on a central axis of the first ultrasonic emitter and ahead of the emitting surface of the first ultrasonic emitter, to emit the carrier wave signal generated by the carrier wave generator in the same direction as an emitting direction of the first ultrasonic emitter, where the phase of the carrier wave signal emitted by the second ultrasonic emitter is opposite to that of the carrier wave signal included in the signal emitted by the first ultrasonic emitter.

Advantageous Effects of Invention

According to the present invention, because it is configured as above, it is possible to emit both the carrier wave signal and the modulated wave signal in the same direction, and reduce the sound pressure level of an audible sound at a distant place at a certain distance or more in the emitting direction.

BRIEF DESCRIPTION OF DRAWINGS

FIG. 2A and FIG. 2B are diagrams showing an example of the shapes and the arrangement of ultrasonic emitters according to Embodiment 1 of the present invention, FIG. 2A is a side view, and FIG. 2B is a front view;

FIG. 3 is a flow chart showing an example of the operation of the parametric array system according to Embodiment 1 of the present invention;

DESCRIPTION OF EMBODIMENTS

Hereafter, the preferred embodiments of the present invention will be explained in detail with reference to the drawings.

Embodiment 1

Figure 1:
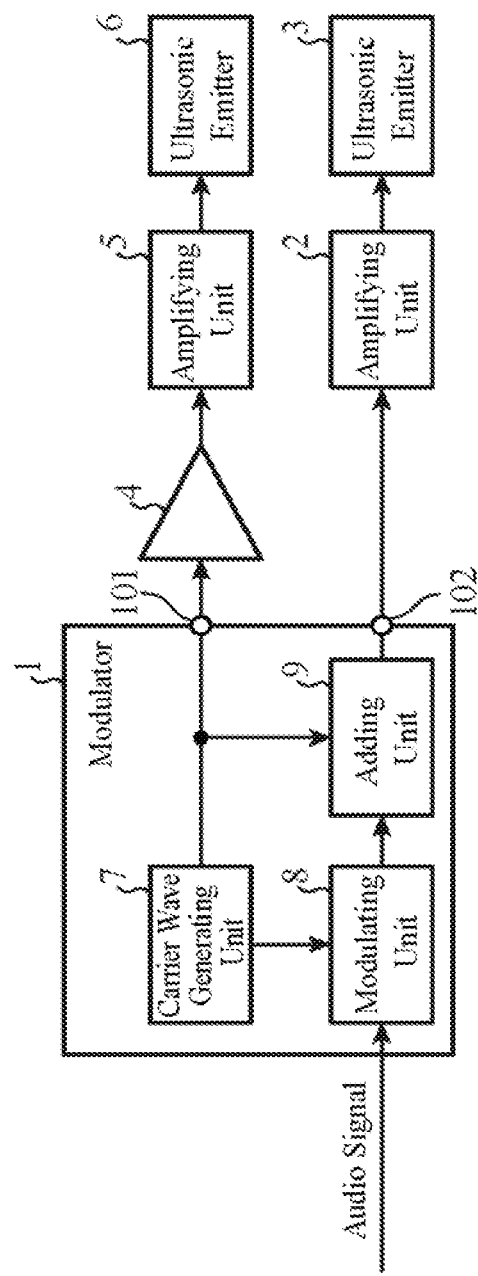
FIG. 1 is a block diagram showing an example of the schematic configuration of a parametric array system according to Embodiment 1 of the present invention.

FIG. 1 is a block diagram showing an example of the schematic configuration of a parametric array system according to Embodiment 1 of the present invention.

The parametric array system includes a modulator 1, an amplifying unit 2, an ultrasonic emitter (first ultrasonic emitter) 3, a gain adjusting unit 4, an amplifying unit 5 and an ultrasonic emitter (second ultrasonic emitter) 6, as shown in FIG. 1. Further, the modulator 1 includes a carrier wave generating unit 7, a modulating unit 8 and an adding unit 9.

The carrier wave generating unit 7 generates a carrier wave signal in an ultrasonic band. The carrier wave signal generated by the carrier wave generating unit 7 is outputted to the modulating unit 8 and the adding unit 9, and is also outputted to the gain adjusting unit 4 via an outputting unit 101 of the modulator 1.

The modulating unit 8 generates a modulated wave signal by performing amplitude modulation on the carrier wave signal generated by the carrier wave generating unit 7 with an audio signal which is an audible sound inputted from the outside. As the modulating unit 8, an SSB (Single SideBand) modulating unit that performs SSB modulation or a DSB (Double SideBand) modulating unit that performs DSB modulation is used. The modulated wave signal generated by the modulating unit 8 is outputted to the adding unit 9.

The adding unit 9 adds the carrier wave signal generated by the carrier wave generating unit 7 and the modulated wave signal generated by the modulating unit 8. A signal which the adding unit 9 generates by adding the carrier wave signal and the modulated wave signal is outputted to the amplifying unit 2 via an outputting unit 102 of the modulator 1.

The amplifying unit 2 amplifies the signal which the adding unit 9 generates by adding the carrier wave signal and the modulated wave signal. At this time, the amplifying unit 2 amplifies the above-mentioned signal up to a level which makes it possible to drive the ultrasonic emitter 3. The signal amplified by the amplifying unit 2 is outputted to the ultrasonic emitter 3.

The ultrasonic emitter 3 emits the signal amplified by the amplifying unit 2 into the air. The ultrasonic emitter 3 includes plural ultrasonic emitter elements 301 (refer to FIG. 2).

The gain adjusting unit 4 adjusts the gain (amplitude) of the carrier wave signal generated by the carrier wave generating unit 7. At this time, the gain adjusting unit 4 performs the gain adjustment in such a way that the carrier wave signal emitted from the ultrasonic emitter 6 has a sound pressure level suitable for reducing the sound pressure level of the carrier wave signal included in the signal emitted from the ultrasonic emitter 3. The carrier wave signal whose gain is adjusted by the gain adjusting unit 4 is outputted to the amplifying unit 5.

The amplifying unit 5 amplifies the carrier wave signal whose gain is adjusted by the gain adjusting unit 4. At this time, the amplifying unit 5 amplifies the above-mentioned carrier wave signal up to a level which makes it possible to drive the ultrasonic emitter 6. The signal amplified by the amplifying unit 5 is outputted to the ultrasonic emitter 6.

The ultrasonic emitter 6 is arranged on a central axis of the ultrasonic emitter 3 and ahead of the emitting surface of the ultrasonic emitter 3, and emits the carrier wave signal amplified by the amplifying unit 5 into the air. Note that the ultrasonic emitter 6 performs the emission in the same direction as the emitting direction of the ultrasonic emitter 3. The ultrasonic emitter 6 includes plural ultrasonic emitter elements 601 (refer to FIG. 2).

Further, the phase of the carrier wave signal emitted by the ultrasonic emitter 6 is opposite to that of the carrier wave signal included in the signal emitted by the ultrasonic emitter 3.

Next, an example of the shapes and the arrangement of the ultrasonic emitters 3 and 6 will be explained with reference to FIG. 2. FIG. 2A shows a side view of the ultrasonic emitters 3 and 6, and FIG. 2B shows a front view of the ultrasonic emitters 3 and 6. Note that in FIG. 2A, a cross section of the ultrasonic emitter 6 is illustrated, and only a part of the ultrasonic emitter elements 601 is illustrated.

The ultrasonic emitter 3 is the same as an ultrasonic emitter used in a conventional parametric array system. On the other hand, the ultrasonic emitter 6 is arranged on the central axis of the ultrasonic emitter 3 and ahead of the emitting surface of the ultrasonic emitter 3, as shown in FIG. 2.

Further, the ultrasonic emitter 6 has an opening 602 in a portion thereof facing the ultrasonic emitter 3. This opening 602 is formed in such a way as to be larger than an emission range of the signal emitted by the ultrasonic emitter 3, the emission range being located at the position at which the ultrasonic emitter 6 is arranged. Note that an angle (emission angle) at which the signal emitted by the ultrasonic emitter 3 is reduced by one-half is determined by the frequency and the vibration radius of the signal.

Further, in FIG. 2, the distance between the ultrasonic emitters 3 and 6 in the emitting direction of the ultrasonic emitters 3 and 6 is set in such a way that the phase of the carrier wave signal emitted by the ultrasonic emitter 6 is opposite to that of the carrier wave signal included in the signal emitted by the ultrasonic emitter 3.

For example, when the frequency of the carrier wave signal is set to 40 [kHz], the distance which causes the phase relationship between the carrier wave signals emitted by the ultrasonic emitters 3 and 6 to change from an in-phase relationship to an opposite phase relationship is (the sound speed)/(the frequency of the carrier wave signal)/2≈4 [mm]. Therefore, in this case, by locating the ultrasonic emitter 6 at a desired distance apart from the ultrasonic emitter 3, and then further adjusting the distance between the ultrasonic emitters 3 and 6 within a range of approximately 4 [mm], the optimal phase relationship can be provided.

Next, an example of the operation of the parametric array system according to Embodiment 1 will be explained with reference to FIG. 3.

In the parametric array system according to Embodiment 1, the carrier wave generating unit 7 generates a carrier wave signal in an ultrasonic band first (step ST1), as shown in FIG. 3.

The modulating unit 8 then generates a modulated wave signal by performing amplitude modulation on the carrier wave signal generated by the carrier wave generating unit 7 with an audio signal which is an audible sound inputted from the outside (step ST2).

The adding unit 9 then adds the carrier wave signal generated by the carrier wave generating unit 7 and the modulated wave signal generated by the modulating unit 8 (step ST3).

The amplifying unit 2 then amplifies a signal which the adding unit 9 generates by adding the carrier wave signal and the modulated wave signal (step ST4).

The ultrasonic emitter 3 then emits the signal amplified by the amplifying unit 2 into the air (step ST5). After that, the signal (carrier wave signal and modulated wave signal) emitted by the ultrasonic emitter 3 is self-demodulated into an audible sound in the air, so that a beam-shaped sound field is formed.

On the other hand, the gain adjusting unit 4 adjusts the gain of the carrier wave signal generated by the carrier wave generating unit 7 (step ST6).

The amplifying unit 5 then amplifies the signal whose gain is adjusted by the gain adjusting unit 4 (step ST7).

The ultrasonic emitter 6 then emits the signal amplified by the amplifying unit 5 into the air (step ST8). After that, the carrier wave signal emitted by the ultrasonic emitter 6 and the carrier wave signal included in the signal emitted by the ultrasonic emitter 3 are combined in an area in which the carrier wave signals overlap with each other, and the sound pressure level of the audible sound reduces.

Figure 4:
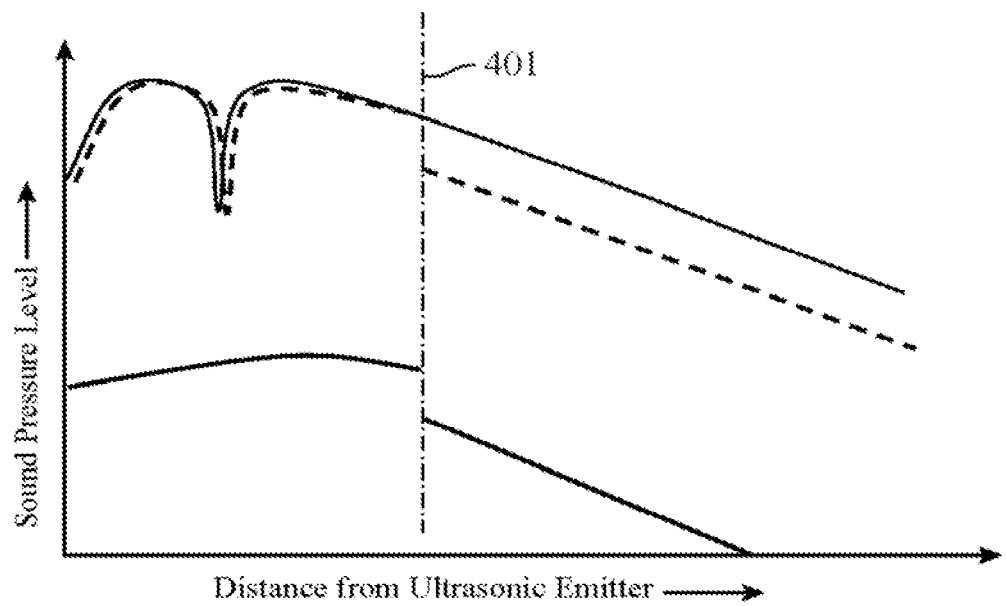
FIG. 4 is a graph showing an example of the propagation characteristics of a sound pressure level in the parametric array system according to Embodiment 1 of the present invention.

Next, an effect produced by the parametric array system according to Embodiment 1 will be explained with reference to FIG. 4. In FIG. 4, the horizontal axis shows the distance from the ultrasonic emitter 3, and the vertical axis shows the sound pressure level. Further, a reference numeral 401 denotes the position at which the ultrasonic emitter 6 is arranged. Further, a thin line shows the modulated wave signal included in the signal emitted from the ultrasonic emitter 3, a broken line shows the carrier wave signal included in the signal emitted from the ultrasonic emitter 3, and a thick line shows the self-demodulated audible sound (difference tone between the carrier wave signal and the modulated wave signal). Note that at a distant place far from the arrangement position of the ultrasonic emitter 6, the carrier wave signal shown in FIG. 4 is a signal in which the carrier wave signal included in the signal emitted from the ultrasonic emitter 3 and the carrier wave signal with the opposite phase emitted from the ultrasonic emitter 6 are combined in the air.

As shown in FIG. 4, in an area near to the ultrasonic emitter 3, the nonlinear interaction between the carrier wave signal and the modulated wave signal is strong, in addition to a cumulative effect caused by the propagation of the signals, and thus the sound pressure level of the self-demodulated audible sound rises. At a propagation distance which is approximately a half of the Rayleigh length determined by the frequency and the vibration radius of the signal emitted from the ultrasonic emitter 3, the sound pressure level of the audible sound has a maximum. After that, at a longer propagation distance, the carrier wave signal and the modulated wave signal attenuate due to sound wave absorption and spherical diffusion, and the nonlinearity becomes weak. As a result, the sound pressure level of the self-demodulated audible sound reduces.

Meanwhile, in the parametric array system according to Embodiment 1, the ultrasonic emitter 6 arranged ahead of the emitting surface of the ultrasonic emitter 3 emits only the carrier wave signal in the same emitting direction as that of the ultrasonic emitter 3.

Where, the phase of the carrier wave signal emitted by the ultrasonic emitter 6 is opposite to that of the carrier wave signal included in the signal emitted by the ultrasonic emitter 3. Therefore, in the area in which the signal emitted by the ultrasonic emitter 3 and the carrier wave signal emitted by the ultrasonic emitter 6 overlap with each other, at least a part of the carrier wave signal is canceled. As a result, as shown in FIG. 4, because the sound pressure level of the carrier wave signal reduces rapidly and the nonlinear interaction between the carrier wave signal and the modulated wave signal becomes weak, the sound pressure level of the audible sound reduces rapidly. Therefore, the sound pressure level of the audible sound can be reduced at a distant place at a certain distance or more in the propagating direction.

Note that in the parametric array system according to Embodiment 1, the ultrasonic emitter 6 is arranged ahead of the emitting surface of the ultrasonic emitter 3. Therefore, it is feared that the ultrasonic emitter 6 (a housing of the ultrasonic emitter) is an obstacle to the signal emitted by the ultrasonic emitter 3. More specifically, if the signal emitted by the ultrasonic emitter 3 is reflected by the ultrasonic emitter 6, the sound pressure level of the signal reduces, the self-demodulation becomes weak, and the sound pressure level of the audible sound in a required area reduces. To cope with this, in the ultrasonic emitter 6, the opening 602 is formed in a portion thereof facing the ultrasonic emitter 3. This opening 602 makes it possible to prevent the signal emitted by the ultrasonic emitter 3 from being reflected by the ultrasonic emitter 6.

Note that in the above explanation, the example in which the distance between the ultrasonic emitters 3 and 6 in the emitting direction of the ultrasonic emitters 3 and 6 causes the phase of the carrier wave signal emitted by the ultrasonic emitter 6 to be opposite to that of the carrier wave signal included in the signal emitted by the ultrasonic emitter 3 is shown. However, this embodiment is not limited to this example. As an alternative, a phase shifter can be used for causing the phase of the carrier wave signal emitted by the ultrasonic emitter 6 to be opposite to that of the carrier wave signal included in the signal emitted by the ultrasonic emitter 3 in the area in which the carrier wave signal emitted by the ultrasonic emitter 6 overlaps with the carrier wave signal included in the signal emitted by the ultrasonic emitter 3. The phase shifter is provided at a previous stage of the ultrasonic emitter 6 (concretely, between the gain adjusting unit 4 and the amplifying unit 5), and shifts the phase of the carrier wave signal in such a way that the phase of the carrier wave signal emitted by the ultrasonic emitter 6 is opposite to that of the carrier wave signal included in the signal emitted by the ultrasonic emitter 3 in the area in which the carrier wave signal emitted by the ultrasonic emitter 6 overlaps with the carrier wave signal included in the signal emitted by the ultrasonic emitter 3.

Further, in the above-mentioned example, it is assumed that the signal emitted by the ultrasonic emitter 6 is a carrier wave signal. Because the frequency of a carrier wave signal is fixed, a phase variation caused by the frequency does not occur. Therefore, it can be expected that the parametric array system operates with stability.

On the other hand, if the signal emitted by the ultrasonic emitter 6 is a modulated wave signal, or a signal which is acquired by adding a carrier wave signal and a modulated wave signal, an audio signal having a wide frequency range is used. Therefore, the phase varies with the frequency. As a result, a combination tone in the area in which the signal emitted by the ultrasonic emitter 3 and the signal emitted by the ultrasonic emitter 6 overlap with each other has frequency characteristics having many peaks and dips, like those of a comb filter. Therefore, in this case, it cannot be expected that the parametric array system operates with stability.

Further, in the above explanation, the example in which the carrier wave generating unit 7 is provided inside the modulator 1 is shown. However, this embodiment is not limited to this example. The carrier wave generating unit 7 can be alternatively provided outside the modulator 1, and the same advantages are provided.

Figure 5:
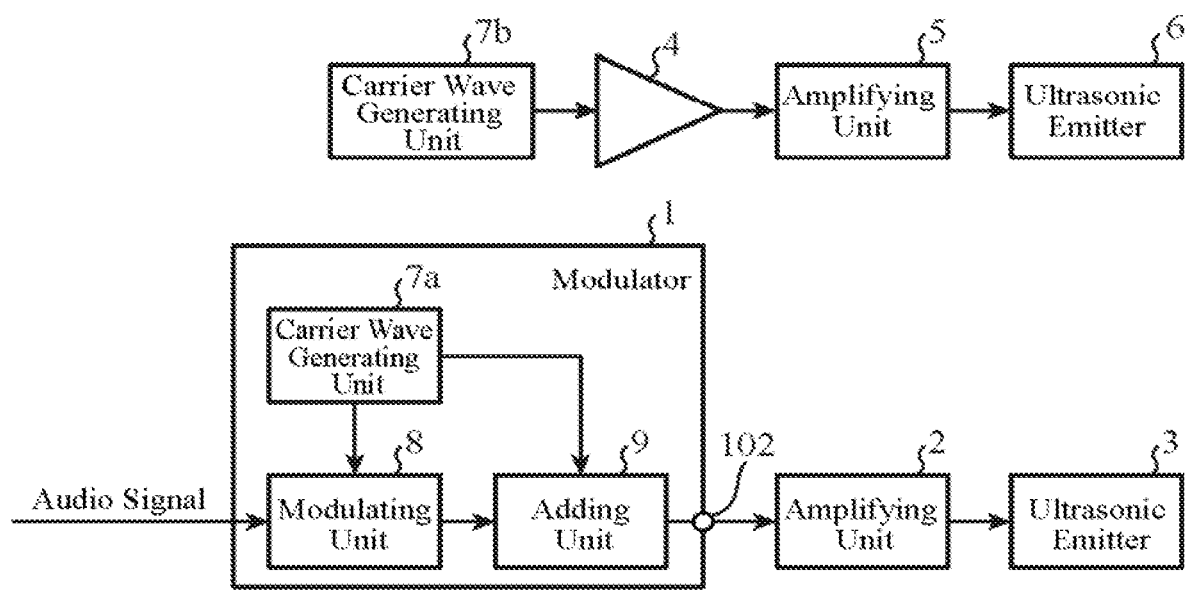
FIG. 5 is a block diagram showing another example of the schematic configuration of the parametric array system according to Embodiment 1 of the present invention.

Further, in the above explanation, the example in which the single carrier wave generating unit 7 is used is shown. However, this embodiment is not limited to this example. For example, as shown in FIG. 5, the carrier wave generating unit 7 can be divided into a carrier wave generating unit 7a (first carrier wave generating unit) for the ultrasonic emitter 3, and a carrier wave generating unit 7b (second carrier wave generating unit) for the ultrasonic emitter 6. In this case, it is necessary that the carrier wave signal generated by the carrier wave generating unit 7a and the carrier wave signal generated by the carrier wave generating unit 7b have the same frequency and waveform.

As mentioned above, according to this Embodiment 1, it is configured to include: the carrier wave generating unit 7 for generating a carrier wave signal; the modulating unit 8 for generating a modulated wave signal by performing amplitude modulation on the carrier wave signal generated by the carrier wave generating unit 7 with an audio signal; the adding unit 9 for adding the carrier wave signal generated by the carrier wave generating unit 7 and the modulated wave signal generated by the modulating unit 8 to generate a signal; the ultrasonic emitter 3 for emitting the signal generated by the adding unit 9; and the ultrasonic emitter 6 arranged on the central axis of the ultrasonic emitter 3 and ahead of the emitting surface of the ultrasonic emitter 3, for emitting the carrier wave signal generated by the carrier wave generating unit 7 in the same direction as the emitting direction of the ultrasonic emitter 3, where the phase of the carrier wave signal emitted by the ultrasonic emitter 6 is opposite to that of the carrier wave signal included in the signal emitted by the ultrasonic emitter 3. Therefore, it is possible to emit both the carrier wave signal and the modulated wave signal in the same direction, and reduce the sound pressure level of an audible sound at a distant place at a certain distance or more in the emitting direction.

Embodiment 2

In Embodiment 1, the example of adding a carrier wave signal and a modulated wave signal which are electric signals by using the adding unit 9 is shown. In contrast with this, in Embodiment 2, an example in which an ultrasonic emitter 11 emits a carrier wave signal and a modulated wave signal, with these wave signals being separated from each other, and the wave signals are combined in the air will be shown.

Figure 6:
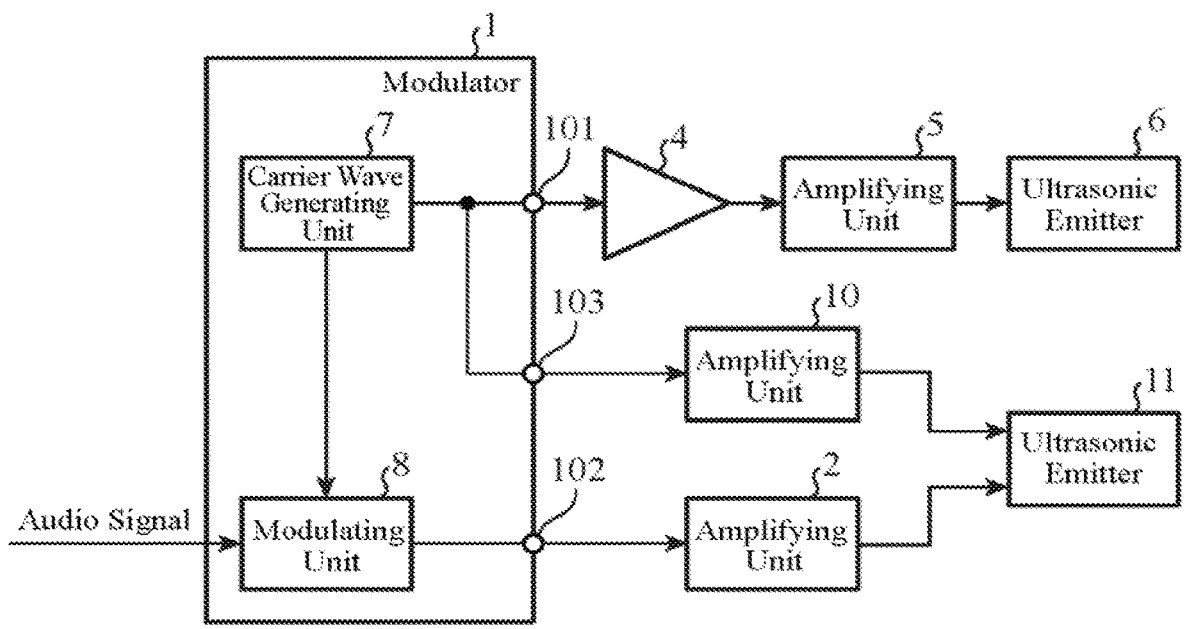
FIG. 6 is a block diagram showing an example of the schematic configuration of a parametric array system according to Embodiment 2 of the present invention.
Figure 7:
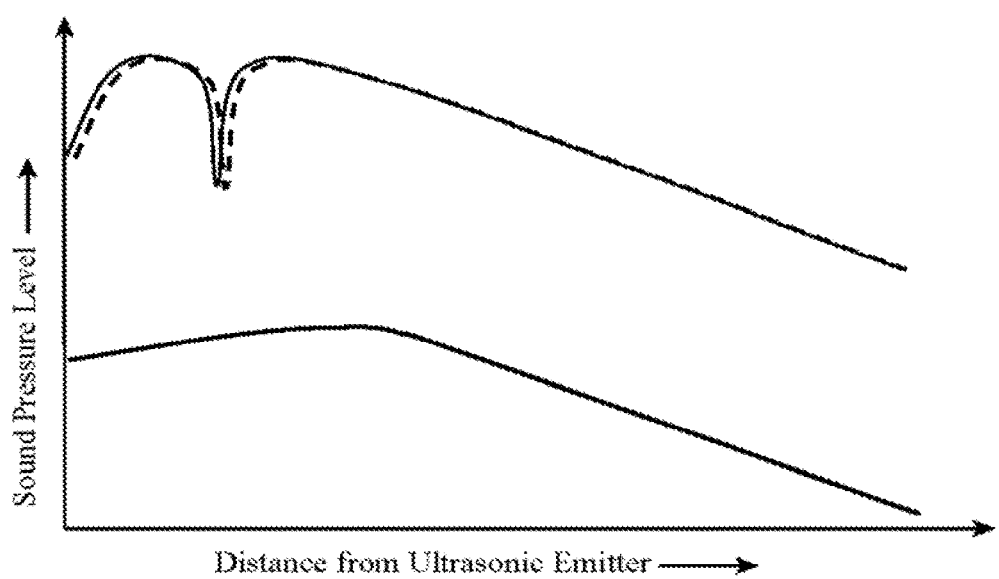
FIG. 7 is a graph showing an example of the propagation characteristics of a sound pressure level in a conventional parametric array system.

FIG. 6 is a block diagram showing an example of the schematic configuration of a parametric array system according to Embodiment 2 of the present invention. In the parametric array system according to Embodiment 2 shown in this FIG. 6, in contrast to the parametric array system according to Embodiment 1 shown in FIG. 1, the adding unit 9 is removed, an amplifying unit 10 is added, and the ultrasonic emitter 3 is changed to the ultrasonic emitter 11. The other components are the same as those shown in FIG. 1, and are denoted by the same reference numerals and the explanation of the components will be omitted hereafter.

Note that a carrier wave signal generated by a carrier wave generating unit 7 is outputted also to the amplifying unit 10 via an outputting unit 103 of a modulator 1, in addition to the functional units shown in Embodiment 1.

The amplifying unit 10 amplifies the carrier wave signal generated by the carrier wave generating unit 7. At this time, the amplifying unit 10 amplifies the above-mentioned carrier wave signal up to a level which makes it possible to drive the ultrasonic emitter 11. The carrier wave signal amplified by the amplifying unit 10 is outputted to the ultrasonic emitter 11.

The ultrasonic emitter 11 emits both the carrier wave signal amplified by the amplifying unit 10 and the modulated wave signal amplified by an amplifying unit 2 into the air in a state in which the carrier wave signal and the modulated wave signal are separated from each other. The ultrasonic emitter 11 includes plural ultrasonic emitter elements (not shown in the figure), and approximately a half of the plural ultrasonic emitter elements emit the carrier wave signal and the other approximately half of the plural ultrasonic emitter elements emit the modulated wave signal. Note that the ultrasonic emitter element that emits the carrier wave signal and the ultrasonic emitter element that emits the modulated wave signal are arranged alternately, for example.

Note that the shapes and the arrangement of the ultrasonic emitters 6 and 11 are the same as those of the ultrasonic emitters 3 and 6 in Embodiment 1 shown in FIG. 2, and the explanation of the shapes and the arrangement will be omitted hereafter.

As mentioned above, because the ultrasonic emitter 11 emits both the carrier wave signal and the modulated wave signal in a state in which the carrier wave signal and the modulated wave signal are separated from each other, the sound pressure level of a self-demodulated audible sound reduces by a little more than that in Embodiment 1, but the emitted carrier wave signal and modulated wave signal cannot be easily affected by the nonlinear characteristics which the ultrasonic emitter 11 has, and the emission of an audible sound having sharper directivity can be performed.

Further, when a carrier wave signal and a modulated wave signal which are electric signals are added, cross modulation occurs. On the other hand, in the parametric array system according to Embodiment 2, because no cross modulation as mentioned above occurs, and the performance of combining with the carrier wave signal emitted by the ultrasonic emitter 6 is good, the performance of cancellation of the carrier wave signal at a distant place can be easily improved.

In addition, it should be noted that unlimited combination of the respective embodiments, modification of any component in the embodiments and omission of any component in the embodiments may be made in the present invention without departing from the scope of the invention.

INDUSTRIAL APPLICABILITY

The parametric array system according to the present invention can emit both a carrier wave signal and a modulated wave signal in the same direction, and reduce the sound pressure level of an audible sound at a distant place at a certain distance or more in the emitting direction, and is suitable for use as a parametric array system or the like that emits an audible sound to a narrow area by using a carrier wave signal in an ultrasonic band.

REFERENCE SIGNS LIST 1 modulator, 2 amplifying unit, 3 ultrasonic emitter (first ultrasonic emitter), 4 gain adjusting unit, 5 amplifying unit, 6 ultrasonic emitter (second ultrasonic emitter), 7, 7a, 7b carrier wave generating unit, 8 modulating unit, 9 adding unit, 10 amplifying unit, 11 ultrasonic emitter, 101 to 103 outputting unit, 301 ultrasonic emitter element, 601 ultrasonic emitter element, and 602 opening.

The invention claimed is:

1. A parametric array system comprising:
a carrier wave generator to generate a carrier wave signal;
a modulator to generate a modulated wave signal by performing amplitude modulation on the carrier wave signal generated by the carrier wave generator with an audio signal;
an adder to add the carrier wave signal generated by the carrier wave generator and the modulated wave signal generated by the modulator to generate a signal;
a first ultrasonic emitter to emit the signal generated by the adder; and
a second ultrasonic emitter arranged on a central axis of the first ultrasonic emitter and ahead of an emitting surface of the first ultrasonic emitter, to emit the carrier wave signal generated by the carrier wave generator in a direction identical to an emitting direction of the first ultrasonic emitter, wherein
a phase of the carrier wave signal emitted by the second ultrasonic emitter is opposite to a phase of the carrier wave signal included in the signal emitted by the first ultrasonic emitter.

2. The parametric array system according to claim 1, wherein a distance between the first and second ultrasonic emitters in the emitting direction of the first and second ultrasonic emitters is set in such a way that the phase of the carrier wave signal emitted by the second ultrasonic emitter is opposite to the phase of the carrier wave signal included in the signal emitted by the first ultrasonic emitter.

3. The parametric array system according to claim 1, wherein the parametric array system includes a phase shifter provided at a previous stage of the second ultrasonic emitter, to shift a phase of the carrier wave signal generated by the carrier wave generator in such a way that the phase of the carrier wave signal emitted by the second ultrasonic emitter is opposite to the phase of the carrier wave signal included in the signal emitted by the first ultrasonic emitter in an area in which the carrier wave signal emitted by the second ultrasonic emitter overlaps with the carrier wave signal included in the signal emitted by the first ultrasonic emitter, and wherein the second ultrasonic emitter emits the carrier wave signal whose phase is shifted by the phase shifter.

4. The parametric array system according to claim 1, wherein the second ultrasonic emitter has an opening larger than an emission range of the signal emitted by the first ultrasonic emitter, the emission range being located at a position at which the second ultrasonic emitter is arranged.

5. The parametric array system according to claim 1, wherein the carrier wave generator comprises first and second carrier wave generators to each generate an identical carrier wave signal, and wherein the modulator generates a modulated wave signal by modulating the carrier wave signal generated by the first carrier wave generator with an audio signal, and the second ultrasonic emitter emits the carrier wave signal generated by the second carrier wave generator.

6. A parametric array system comprising:
a carrier wave generator to generate a carrier wave signal;
a modulator to generate a modulated wave signal by performing amplitude modulation on the carrier wave signal generated by the carrier wave generator with an audio signal;
a first ultrasonic emitter to emit the carrier wave signal generated by the carrier wave generator and the modulated wave signal generated by the modulator, with the carrier wave signal and the modulated wave signal being separated from each other; and
a second ultrasonic emitter arranged on a central axis of the first ultrasonic emitter and ahead of an emitting surface of the first ultrasonic emitter, to emit the carrier wave signal generated by the carrier wave generator in a direction identical to an emitting direction of the first ultrasonic emitter, wherein
a phase of the carrier wave signal emitted by the second ultrasonic emitter is opposite to a phase of the carrier wave signal emitted by the first ultrasonic emitter.

7. The parametric array system according to claim 6, wherein a distance between the first and second ultrasonic emitters in the emitting direction of the first and second ultrasonic emitters is set in such a way that the phase of the carrier wave signal emitted by the second ultrasonic emitter is opposite to the phase of the carrier wave signal emitted by the first ultrasonic emitter.

8. The parametric array system according to claim 6, wherein the parametric array system includes a phase shifter provided at a previous stage of the second ultrasonic emitter, to shift a phase of the carrier wave signal generated by the carrier wave generator in such a way that the phase of the carrier wave signal emitted by the second ultrasonic emitter is opposite to the phase of the carrier wave signal emitted by the first ultrasonic emitter in an area in which the carrier wave signal emitted by the second ultrasonic emitter overlaps with the carrier wave signal emitted by the first ultrasonic emitter, and wherein the second ultrasonic emitter emits the carrier wave signal whose phase is shifted by the phase shifter.

9. The parametric array system according to claim 6, wherein the second ultrasonic emitter has an opening larger than an emission range of the signal emitted by the first ultrasonic emitter, the emission range being located at a position at which the second ultrasonic emitter is arranged.

10. The parametric array system according to claim 6, wherein the carrier wave generator comprises first and second carrier wave generators to each generate an identical carrier wave signal, and wherein the modulator generates a modulated wave signal by modulating the carrier wave signal generated by the first carrier wave generator with an audio signal, and the second ultrasonic emitter emits the carrier wave signal generated by the second carrier wave generator.

\* \* \* \* \*